(12) United States Patent
Chen et al.

(10) Patent No.: US 10,938,553 B2
(45) Date of Patent: Mar. 2, 2021

(54) DISTRIBUTION AND VERIFICATION OF TRANSACTION INTEGRITY KEYS

(71) Applicants: Hewlett Packard Enterprise Development LP, Houston, TX (US); Liqun Chen, Bristol (GB); Nigel Edwards, Bristol (GB)

(72) Inventors: Liqun Chen, Bristol (GB); Nigel Edwards, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 438 days.

(21) Appl. No.: 15/573,565

(22) PCT Filed: Nov. 27, 2015

(86) PCT No.: PCT/EP2015/077889
§ 371 (c)(1),
(2) Date: Nov. 13, 2017

(87) PCT Pub. No.: WO2017/088930
PCT Pub. Date: Jun. 1, 2017

(65) Prior Publication Data
US 2018/0123785 A1    May 3, 2018

(51) Int. Cl.
*H04L 9/00* (2006.01)
*H04L 9/08* (2006.01)
*H04L 9/06* (2006.01)
*H04L 9/32* (2006.01)

(52) U.S. Cl.
CPC .......... *H04L 9/0822* (2013.01); *H04L 9/0631* (2013.01); *H04L 9/0861* (2013.01); *H04L 9/0869* (2013.01); *H04L 9/3242* (2013.01)

(58) Field of Classification Search
CPC .................................................... H04L 9/0822
See application file for complete search history.

(56) References Cited

U.S. PATENT DOCUMENTS

| 8,126,148 | B2 | 2/2012 | Chowdhury et al. |
| 8,819,765 | B2 | 8/2014 | Naslund et al. |
| 9,942,034 | B2* | 4/2018 | Le Saint ............... H04L 9/0822 |
| 2002/0174332 | A1* | 11/2002 | Vialen .................. H04L 9/0643 713/152 |

(Continued)

OTHER PUBLICATIONS

International Search Report and Written Opinion received for PCT Patent Application No. PCT/EP2015/077889, dated Jul. 14, 2016, 8 pages.

(Continued)

*Primary Examiner* — Josnel Jeudy
(74) *Attorney, Agent, or Firm* — Hewlett Packard Enterprise Patent Department

(57) ABSTRACT

The present disclosure relates to generating an identifier, an encrypted value that is an original value encrypted, and a Message Authentication Code (MAC) at a server device, and to generating a message including a message header and a message body, said message header including the identifier and the MAC, and said message body including the encrypted value, and said that the MAC key used to compute the message authentication code is included in the original value to be encrypted, and further relates to transmitting the message to a client device.

15 Claims, 5 Drawing Sheets

(56) References Cited

U.S. PATENT DOCUMENTS

| | | | | |
|---|---|---|---|---|
| 2004/0068470 | A1* | 4/2004 | Klyne | G06Q 20/12 |
| | | | | 705/50 |
| 2007/0260891 | A1* | 11/2007 | Starr | G06F 21/6218 |
| | | | | 713/193 |
| 2008/0002594 | A1* | 1/2008 | Forsberg | H04L 9/12 |
| | | | | 370/252 |
| 2009/0103730 | A1 | 4/2009 | Ward et al. | |
| 2012/0089519 | A1 | 4/2012 | Peddada | |
| 2013/0124866 | A1* | 5/2013 | Farrugia | H04L 9/0822 |
| | | | | 713/171 |
| 2013/0279367 | A1* | 10/2013 | Sarikaya | H04L 29/06068 |
| | | | | 370/254 |
| 2015/0106900 | A1* | 4/2015 | Pinski | H04W 12/06 |
| | | | | 726/7 |
| 2020/0111095 | A1* | 4/2020 | Osborn | G06Q 20/3674 |

OTHER PUBLICATIONS

Bird, R. et al., "The KryptoKnight Family of Light-Weight Protocols for Authentication and Key Distribution," 1995, pp. 31-41, https://www.eecis.udel.edu/~mills/teaching/eleg867b/cryptography/p31-bird.pdf.

Boyd, C. et al., "Protocols for Authentication and Key Establishment," 2003, pp. 116-117, http://eprints.qut.edu.au/9636/.

International Preliminary Report on Patentability received in PCT Application No. PCT/EP2015/077889, dated Jun. 7, 2018, 7 pages.

Menezes, A.J. et al., "Chapter 12: Key Establishment Protocols," 1996, pp. 489-541, http://www.cacr.math.uwaterloo.ca/hac/.

A. Menezes et al., "Handbook of Applied Cryptography: Chapter 12: Key Establishment Protocols," Oct. 1996, pp. 489-541, CRC Press, Boca Raton, Florida, USA.

Colin Boyd et al., "Protocols for Authentication and Key Establishment," Jan. 1, 2003, pp. 116-117, Springer.

Ray Bird et al., "The KryptoKnight Family of Light-Weight Protocols for Authentication and Key Distribution," IEEE/ACM Transactions an Networking, Feb. 1, 1995, pp. 31-41, No. 1, New York, USA, IEEE.

Wong, C.K., et al., Secure Group Communications Using Key Graphs, Feb. 2000, IEEE/ACM Transaction on Networking, vol. 8, No. 1, pp. 16-30.

\* cited by examiner

DISTRIBUTION AND VERIFICATION OF TRANSACTION INTEGRITY KEYS

Computing devices that are connected, such as via remote link or via a network, communicate by sending messages to one another. Messages are at risk of being modified by a third party while being transferred. Further, a message received at a computing device may originate from a third party that pretends to be a legitimate source.

BRIEF DESCRIPTION OF THE DRAWINGS

Examples of this disclosure are now described with reference to the drawings in which.

DETAILED DESCRIPTION

Figure 1:
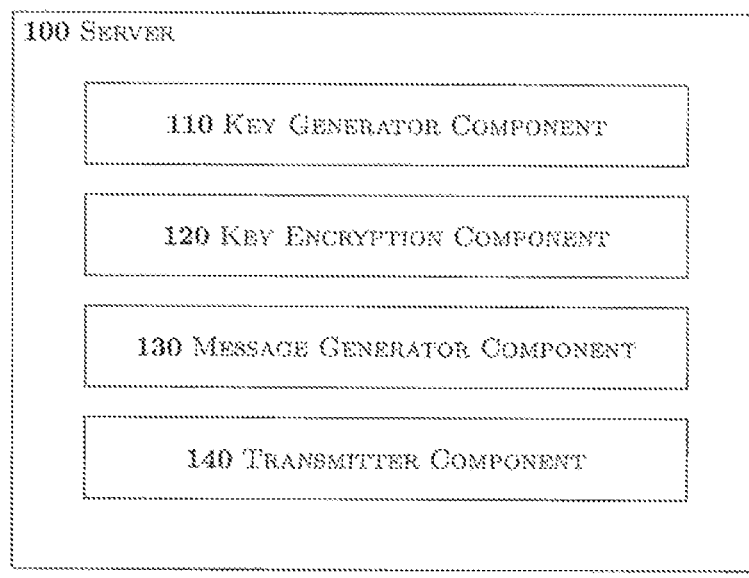
FIG. 1 shows an example server device comprising components for implementing aspects of the disclosure.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

After receiving a message, a computer device may apply cryptographic techniques in order to verify that the message was not identified by a third party computing device and for that it actually originates from the source it indicated. Cryptographic techniques may require an exchange of cryptographic keys prior to verifying a message.

One example of cryptographic keys comprises a pair of asymmetric keys, such as a private key and a public key. Both private and public key may be generated with a dedicated program on a computing device. The public key may be distributed to other parties, whereas the private key may be kept as a secret by the party that generated it. Anyone with access to the public key can encrypt data. However, only the owner of the private key can decrypt the encrypted data.

Another example of a cryptographic key comprises a symmetric key. Anyone with access to the symmetric key can use the symmetric key to encrypt data. Similarly, anyone with access to the symmetric key can decrypt data that is decrypted with the symmetric key.

Regardless of which type of cryptography is used, messages can typically be verified against unauthorized modification and unauthorized sources. Generally, the mere fact that received data can be decrypted ensures that the data was encrypted with the correct key. Similarly, a signature attached to received data can be verified to have been sent by a party that has access to the correct key.

Verifying messages this way works on the condition that the keys have been distributed to their intended recipients.

A Message Authentication Code (MAC) is one approach to verify message integrity. A computing device that wants to verify message integrity of a message received from a destination computing device may perform a MAC procedure. In particular, the computing device may perform a MAC procedure that accepts two input parameters, namely data, such as data contained in a received message, and a secret key. The computing device may continue to perform the MAC procedure by computing a checksum from these parameters, said checksum referred to as the MAC. Provided that the secret key has been exchanged by the communicating parties, the computing device and the destination computing device may recompute the MAC in order to verify message integrity for a received message. If the recomputed MAC matches a MAC that is included in the message, the computing device has ensured that the destination computing device is in possession of the secret key. A MAC may be based on a hash, and is referred to as Hashed-based Message Authentication Code (HMAC). References to MAC made herein equally include the possibility to apply MAC and/or HMAC.

A replay attack can be made by a third party computing device that intercepts the exchange of the secret key. Thus, it is possible for a third party computing device to provide messages with a correct MAC based on the intercepted secret key and any message data. In order to prevent a replay attack, the computing device and destination computing device may supplement the key with a number that may only be used once. Examples of such a number include a time stamp or a sequence number, such as a monotonically increasing counter. The computing device and destination computing device may compute the MAC based on the number, hence enabling the destination computing device to verify that a received message originates from the source it indicates.

In some examples, the computing device and the destination computing device may use a Transaction Integrity Key (TIK), which is a key intended to be used for multiple messages, rather than only for a single message, and is hence required to be distributed safely. The computing device and destination computing device may compute the TIK using various approaches, including but not limited to using a random number generator or a Key Derivation Function (KDF).

The computing device and destination computing device may create keys by using encryption protocols. Examples of encryption procedures are provided in the Advanced Encryption Standard (AES). Some encryption procedures operate on bit strings of fixed length also referred to as a block size. Examples of the present disclosure may ensure that keys are safely distributed and that a message received at a computing device is from the destination computing device indicated by the message.

Examples disclosed herein include a method executed at a server device. Herein, a server device may refer to a dedicated computing device for distributing keys to one or more client devices. However, any computing device that wishes to exchange messages with another computing device may also act as the server. In some examples, the server may be the computing device described above, and the client device may be the destination computing device described above. Additionally the server device and the client device may change their roles, with the server device acting as a receiver of a key and the client device acting as a distributor.

For example, a key K can be shared by the server device with a computing device hereinafter referred to as the client device. K may either be one key of an asymmetric pair of keys or a single symmetric key. If it is an asymmetric key pair, the pair include a public encryption key and a private decryption key. For the purpose of the communications in which the server device is the message sender and the client device is the message receiver, the server device holds the public encryption key and the client device holds the private decryption key. If it is a symmetric key, the server device and client device both know the symmetric key. For simplicity, it is assumed that K is symmetric. In the symmetric key case, K may be computed according to AES or to any other symmetric encryption procedure. However, K is not limited to being a symmetric key according to AES; rather, K is not limited by the examples described herein.

The server may first compute a TIK. Computing the TIK may involve applying a Key Derivation Function (KDF). Applying a KDF generally produces one or more secret keys, and a predefined one of these may be used as the TIK. In one embodiment, the TIK is 128 bits in length.

Thereafter, the server may create an identifier that is unique to K. Examples of the identifier may include sequence numbers, time stamps, and random numbers. A sequence number may be a number that is incremented at certain intervals or events by a fixed amount, by a varying amount, such as a random amount, and/or by another manner. Incrementing the sequence number may include adding 1 to a previous sequence number. A time stamp, also referred to as precision time, may denote a current time in a given format. One example of a time stamp may be the current time provided with high precision, such as including milliseconds. In particular, the time stamp may represent the number of seconds and/or milliseconds that passed since a predefined point in time. A random number is a number within a predefined range that is arbitrary and is unlikely or even impossible to generate a second time. The identifier may be unique to K to the extent that it is not intended to be used more than once for the client. In some embodiments, it is not intended to be used more than once for any client. In other embodiments, it may also be used for one or more other clients, but not more than once for each client. The identifier may comprise an Anti-Replay Tag (ART) in some embodiments. In some examples, the identifier may have a fixed length, such as a 32-bit unsigned integer. In some examples, the identifier is incremented by 1 when being created, and hence may be treated as a modulo counter when using a fixed length.

Responsive to creating an identifier unique to K, the server may encrypt the TIK with K and the identifier to obtain an encrypted value. In one example, the server may encrypt TIK based on AES encryption and/or other appropriate encryption protocol. In examples in which AES encryption is used, the server may use the AES protocol for encrypting the TIK to a predefined bit length, namely to the block size of the AES encryption. Alternative encryption protocols may be applied instead, including Triple Data Encryption Standard (Triple DES), International Data Encryption Algorithm (IDEA), and Rivest-Shamir-Adleman (RSA). In the RSA algorithm, an asymmetric key pair is used. The purpose of the encrypted value having a predefined bit length is detailed further below. With any encryption protocol that is applied, the server may encrypt the TIK to a predefined bit length associated with that protocol.

Still further, the server may apply a MAC procedure to the encrypted value and to the identifier. In one example, the server may concatenate the encrypted value and the identifier in a predefined order prior to generating the MAC. In another example, the server may combine the encrypted value and the identifier in a predefined manner other than by concatenating, such as but not limited by interleaving bits of the identifier and the encrypted value.

The server may enclose the encrypted value, the identifier, and the MAC in a data packet. Data packets may comply with a predetermined protocol that is used for communication between the server and the client. Hence, the aforementioned items comply with a format defined by the protocol. In the most general case, data packets include a header section and a data or body or payload section. The header section generally may be used for protocol-specific information, whereas the payload section generally may be used for data that is independent of the protocol. Examples of the present disclosure include having the server device insert the encrypted value, the identifier and the MAC in either or both sections of the data packet. A specific example of a particular data packet format with these items is discussed below.

Further examples disclosed herein relate to a method executed at a client device. Any computing device may act as the client. However, a specific computing device with dedicated hardware and/or program components for applying the method is discussed further below. However, the specific computing device is not to be construed as limiting the disclosed embodiments, because common computing devices may act as a client according to the principles provided below.

Initially, the method may comprise receiving, by the client device, a message from a server device, such as from the server device defined above. The message may be represented by one or more data packets.

Subsequent to receiving the message, the client device may retrieve an encrypted value, an identifier, and a MAC from the message. In some examples, these items may have been generated at the server device side and encapsulated into the message according to the details provided above.

Based on the encrypted value, the identifier and on a shared key K, the client device may retrieve a TIK. In some examples, the shared key K may have been previously shared by the server device with the client device. For example, if encrypting the TIK at the server is based on AES encryption, retrieving the TIK on the client device is based on AES decryption. However, this is not to be construed as limiting to AES, as alternative procedures for encryption and decryption may be used on both sides.

The client device may compute a MAC from the previously retrieved TIK. In some examples, the client device may compute the MAC in the same way as performed on the server device and as described above. To this extent, the client device may generate the MAC based on the TIK as a MAC key and on the encrypted value and the identifier retrieved from the message.

The client device may compare the MAC computed on the client device to the MAC from the message. If both match, the client device may accept the TIK generated on the client device as authentic. In this case, the client device may determine that the TIK was actually sent by the server device, and that the TIK may be used henceforth to ensure the authenticity of future messages. In one example, the client device may reject the TIK if the compared values do not match. In some examples, the client device may reject the TIK by notifying the server device and/or notifying a user at the client device that the message lacks integrity and is likely to have been modified.

FIG. 1 shows an example server device suitable for applying the methods disclosed herein.

First, a server device 100 is shown as comprising a key generator component 110, a key encryption component 120, a message generator component 130, and a transmitter component 140. While functionality may be described as being performed by a particular component, that functionality may be performed by another component (listed here or otherwise part of the corresponding computing device—e.g., server device 100 or client device 200 discussed below). All of these components may be implemented in hardware and/or hardware programmed with machine executable instructions which, when executed, cause the hardware to implement the components. Specific implementations of the components may involve hardware components such as one or more secure cryptoprocessors. A cryptoprocessor may be included in particular for carrying out action that relies on encryption and/or decryption, such as generating a TIK or generating a MAC. Also, additional or fewer components may be included than those shown in FIG. 1. In one embodiment, the functionality provided by the key generator component 110, the key encryption component 120, and the message generator component 130 may be provided by a single hardware component. In one embodiment, the server device may be a dedicated computing device that is provided for the sole purpose of distributing TIKs according to methods disclosed herein. In one specific example, the server device 100 is not actually a computing device, but is entirely implemented as a server process running on a computing device that has been modified to include the components described above.

The components in server device 100 may be coupled with one another to provide the following functionality.

The key generator component 110 may generate a TIK as outlined above. The key generator component 110 may generate an identifier which is unique for a cryptographic key K that was previously shared by the server device 100 with a client device 200. The server device 100 may generate the cryptographic key K according to details provided above. In some examples, the server device 100 may generate the TIK and the identifier in any order. In some examples, the server device 100 may generate the TIK and the identifier in parallel, such as by concurrent threads or by two secure cryptoprocessors.

Server device may maintain a table (not shown) that includes generated TIKs and corresponding client devices.

The key encryption component 120 may generate an encrypted value according to any measures discussed herein. Specifically, the encrypted value may be generated by encrypting the TIK based on K and on the identifier. The key encryption component 120 may generate a MAC based on the TIK, the encrypted value and the identifier.

The message generator component 130 may generate a message, such as a message represented by a data packet that includes a header section, or message header, and payload section, or message body. The message generator component 130 may insert the identifier, the MAC and the encrypted value into the message. Again, the format of the message may be maintained to comply with a predefined protocol for transferring the message.

Figure 2:
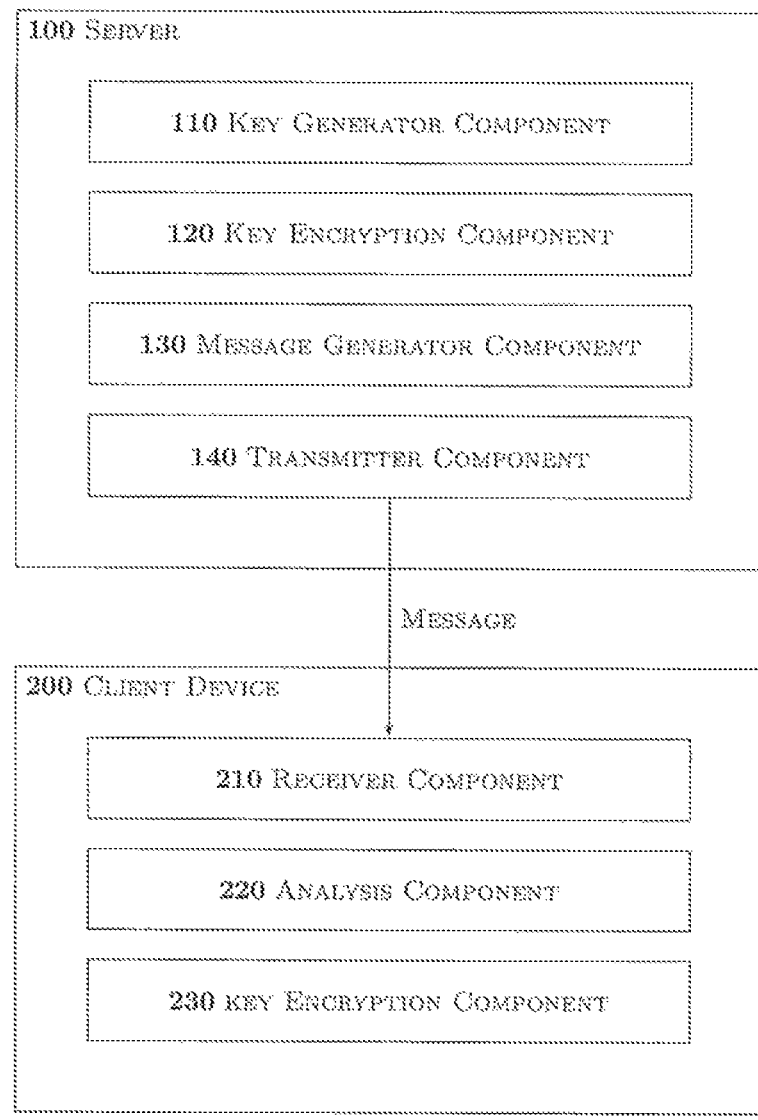
FIG. 2 shows an example server device and client device comprising components for implementing aspects of the disclosure.

FIG. 2 shows the server device 110 of FIG. 1 in connection with a client device 200. Client device 200 includes a receiver component 210, an analysis component 220, and a key encryption component 230. Similar to the components of server device 100, the components in the client device 200 may be implemented in hardware and/or hardware programmed with machine readable instructions. In some examples, the client device 200 may comprise one or more secure cryptoprocessors to implement certain functionality, in particular functionality for encryption and decryption.

Server device 100 and client device 200 may be connected, such as via direct point-to-point connection or via an intermediate network.

The transmitter component 140 of the server device 110 may transmit the message to the client device 200, such as by transmitting the data packet that represents the message over a network adapter. The message either may be sent directly to the client device 200 or routed thereto, depending on the connection of server device 100 and client device 200.

The client device 200 may receive the message via its receiver component 210. The receiver component 210 may pass the message on to analysis component 220, where the encrypted value, the identifier, and the MAC may be retrieved from the message. Responsive to retrieving the encrypted value, identifier, and MAC, analysis component 220 may generate a TIK based on the encrypted value and the identifier. The analysis component 220 may provide the TIK and/or other received information (e.g., encrypted value, identifier, MAC, and/or other received information) to the key encryption component 230.

In some examples, the key encryption component 230 may be of identical structure as key encryption component 120 of the server device 100. The key encryption component 230 may encrypt the encrypted value based on the TIK. In particular, the key encryption component 230 may encrypt the encrypted value based on MAC measures, such as the functionality applied by the key encryption component 130 in the server device as described above. Responsive to encrypting the encrypted value based on MAC measures, the key encryption component 230 may generate a MAC. The key encryption component 230 may compare the generated MAC to the MAC in the received message. If both values match, the key encryption component 230 may accept the TIK as authentic. In some examples, the key encryption component 230 may reject the TIK if the generated MAC does not match the MAC in the received message. In an example in which the TIK is rejected, the client device 200 may notify the server device and/or a user of the client device accordingly.

Figure 3:
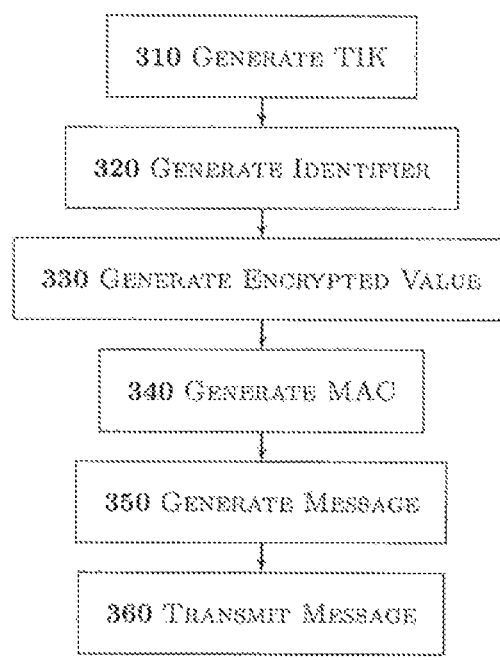
FIG. 3 shows a flow diagram of a method to be performed by a server.

FIG. 3 shows a method 300 performed at a server device, such as at server device 100, as described above.

Although execution of the methods described below are with reference to server device 100 and/or client device 200 of FIG. 1 and/or FIG. 2, other suitable devices for execution of this method will be apparent to those of skill in the art. The method described in FIG. 3 and other figures may be implemented in the form of executable instructions stored on a machine-readable storage medium, by one or more components described herein, and/or in the form of electronic circuitry.

Method 300 starts at block 310, where a TIK is generated. For example, the key generator component 110 may be suited to perform block 310. The key generator component 110 may generate an identifier at block 320, said identifier unique for a cryptographic key K, where the cryptographic K may have been previously shared with a predetermined client device, such as client device 200. At block 330, the key encryption component 120 detailed above may generate an encrypted value by encrypting the TIK based on K and the identifier. The key encryption component 120 at block 340 may generate a MAC based on a MAC key that comprises the TIK and on MAC data that includes the encrypted value and the identifier. Finally, a message may be generated at block 250, such as by message generator component 130, said message including a message header and a message body, said message header including the identifier and the MAC, and said message body including the encrypted value. The message may be transmitted by the transmitter component 140 to the client at block 360.

Figure 4:
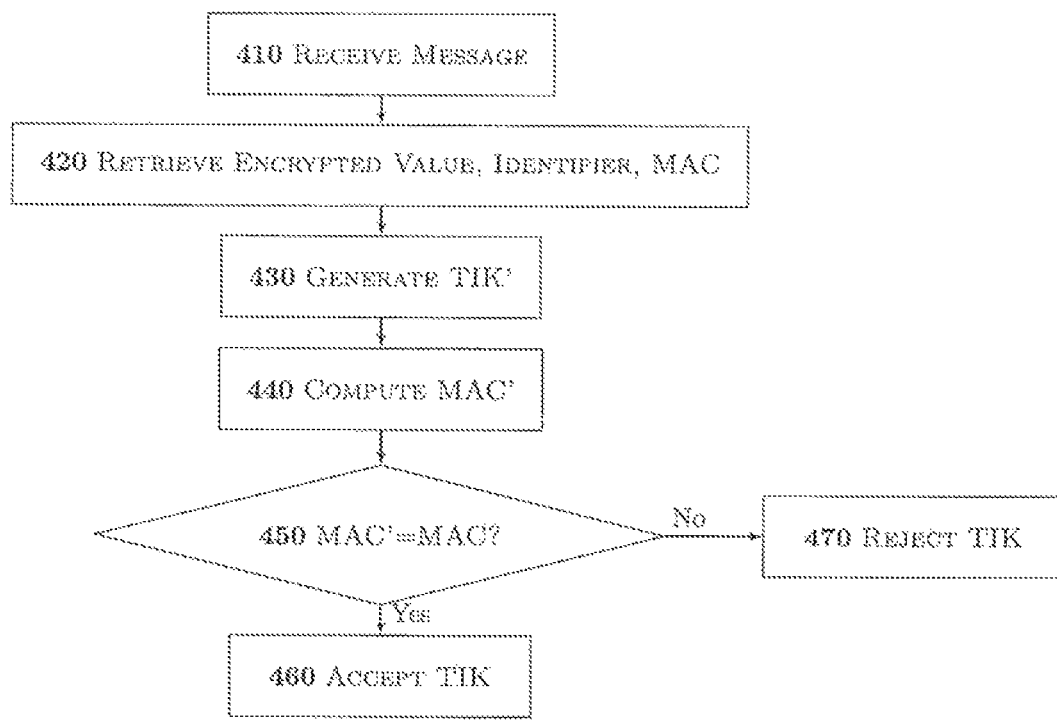
FIG. 4 shows a flow diagram of a method to be performed by a client.

FIG. 4 shows a method 400 performed at a client device, such as at client device 200, as described above.

Method 400 starts at block 410 with receiving the message. As an example, this may be performed by the receiver component 210 discussed above. The encrypted value, the identifier, and the MAC may be retrieved from the message at block 420, such as by the analysis component 210. The analysis component 220 may generate a TIK, here illustrated as TIK', at block 430, based on the encrypted value and on the identifier. A MAC may be computed at block 440, here illustrated as MAC'. Computing the MAC may be based on the TIK as a MAC key and on the encrypted value and the identifier as MAC data. Block 440 may be performed by the key encryption component 230. The key encryption component 230 may compare the computed MAC to the MAC retrieved from the message, at block 450. The TIK may be accepted at block 460, provided that both values match. Otherwise, and only in certain examples, the TIK may be rejected by the key encryption component 230, as is illustrated by block 470. However, this rejection may be optional and may be omitted. As an alternative to rejecting the TIK, the message may still be delivered. For example, the message may be marked with a note that indicates difficulties in verifying the TIK.

Certain measures may be taken in order to embed items in a message. As is mentioned above, items may be inserted in a message header and/or a body. Headers are generally defined by a preselected protocol and confine certain items in the header to fixed bit lengths.

In one example, a protocol may reserve a portion in the message to be used for the items distributed according to embodiments described herein.

Figure 5:
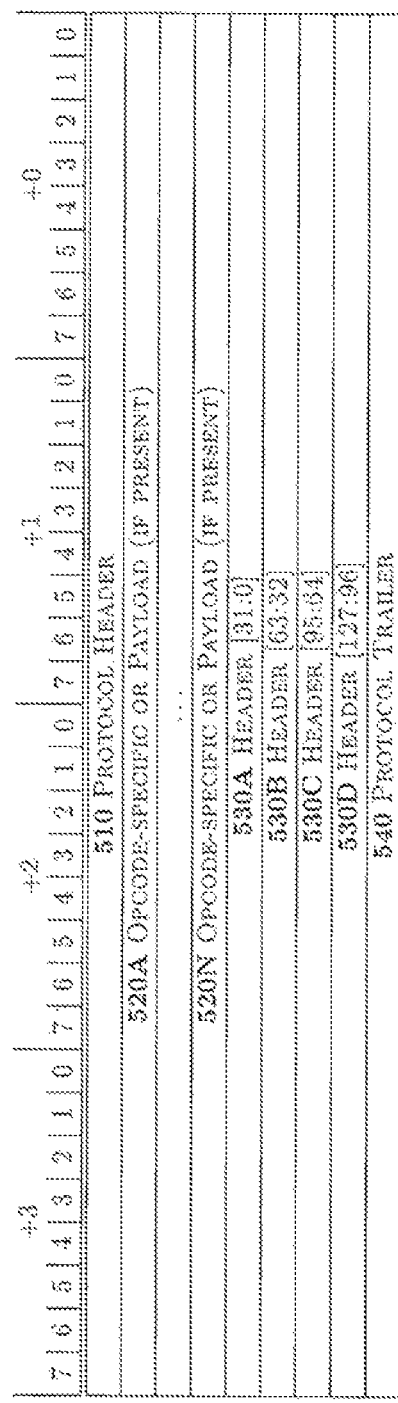
FIG. 5 shows an example packet used in communication between a server device and a client.

FIG. 5 shows a diagram of an example data packet. The data packet may represent a message sent between a server device and a client device, such as the message shown in FIG. 2 as being transmitted from server device 100 to client device 200. The top row of the diagram indicates the number of bits used for individual portions of the data packet. In the example of FIG. 5, the number of bits is 32, separated in four bytes of 8 bits, respectively. To this extent, FIG. 5 is to be construed as an example only, as alternative data packets with alternative bit lengths may be used. A simplified protocol header 510 of 32 bits width is shown at the beginning of the data packet. The protocol header 510 may include protocol-specific values, such as source and receiver addresses, and is not detailed herein further. Subsequent bits are occupied with opcode-specific or payload data 520A to 520N, hereinafter referred to as payload 520, and may comprise arbitrary data to be communicated to the receiver. At the end of the data packet, a header 530A to 530D, hereinafter referred to as header 530, is included. Header 530 is shown with 128 bits size but may have a different fixed size. Also, header 530 does not necessarily have to be included at the end of the data packet, but may also appear as part of an extended protocol header 510 or as a separate field between header 510 and payload data 530.

In one example, header 530 comprises the identifier discussed above. For example, the identifier may be 32 bits in length. In this case, the identifier is written to the 32 bits of header 530A, followed by writing cleared bits to all 32 bits of header 530B. More generally, all bits in the header 530 following the identifier are cleared until the first half of all bits of header 530 is set. Still more generally, all bits in the header 530 following the identifier are cleared until a predefined bit position of header 530 is reached. The remaining bits of the header 530, namely the bits pertaining to header 530C and header 530D, are used to write the MAC obtained according to measures disclosed herein, in particular according to block 240 discussed with regard to FIG. 3.

The encrypted value generated at block 330 of FIG. 3 and discussed further above may be written to the payload 520, such as to a leading position of the payload 520A (e.g., by server 100). However, alternative positions may be provided, such as writing the encrypted value to an additional portion of header 530 (not shown). However, payload 520 as a whole may or may not be encrypted, and writing the encrypted value to payload 520 does not require or even imply that the remainder of payload 520 is encrypted.

In order to create a data packet as described, generating the identifier in block 320 of FIG. 3 may further include determining whether the identifier is shorter than a block size of the MAC. This may be advantageous in examples that rely on header 530 to include identifier and MAC at predictable positions and with equal sizes. If the identifier is shorter than the block size, cleared bits are appended to the identifier until the block size is reached. Alternatively, cleared bits may be prepended to the identifier until the block size is reached. If the identifier is longer than the block size, the identifier may be converted into a shorter value, and the aforementioned measure of appending or prepending cleared bits to the identifier may be taken. Converting the identifier this way may include applying a hash function to the identifier. If the identifier is already equal in length to the block size, it does not need to be modified. As an alternative to clearing bits until block size is reached, bits may be cleared until a predefined bit position is reached. Effectively, these steps result in a header 530 containing the identifier and the MAC at predefined positions and with predefined bit lengths, hence enabling the receiving client device or receiver component to obtain both values.

Similar treatment may be applied to the MAC when generating the MAC at block 340 or when generating the message at block 350 of FIG. 3. To this extent, the leading bits of a generated MAC may be selected for writing the MAC to header 530. In one example, the leading 64 bits may be selected, but different numbers of leading bits may be selected, depending on definitions that are known both to server device 100 and client 200. On the receiving side, this entails selecting only the leading bits from the MAC computed at block 440. Effectively, the numbers of bits of the MAC that are written to the header 530 are equal to the number of bits selected from the MAC that is computed at block 440.

The data packet of FIG. 5 is further shown with a protocol trailer 540 which may be used to store additional bit fields, such as bit fields that are required by the underlying protocol.

The above provides for safe distribution of keys, in particular distribution of TIKs. One aspect in this regard is that TIK is transmitted in encrypted form within a message, and concomitant items from the same message are used to verify the TIK. This requires limited resources and communication and is hence efficient. At the same time, a high level of security is thereby achieved.

Examples disclosed herein are reflected by the appended claims. In addition to these claims, a client device may be provided, comprising a receiver component to receive a message from a server device; an analysis component to retrieve an encrypted value from the message body and an identifier previously shared by the server device, and a MAC from the message header, and further to generate a TIK based on the encrypted value and the identifier; and a key encryption component to encrypt the encrypted value based on the TIK, and to compare the result to the MAC, and further to accept the TIK as authentic if the result matches the received MAC.

The foregoing disclosure describes a number of example embodiments for distribution and verification of transaction integrity keys. The disclosed examples may include systems, devices, computer-readable storage media, and methods for distribution and verification of transaction integrity keys. For purposes of explanation, certain examples are described with reference to the components illustrated in FIGS. 1 to 5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method comprising:
generating, by a server device, a Transaction Integrity Key (TIK), wherein the TIK is to be used for a plurality of messages between the server device and a predetermined client device;
generating, by the server device, an identifier which is unique for a cryptographic key (K) other than the TIK, wherein the K has been previously shared with the client device;
generating, by the server device, an encrypted value by encrypting the TIK based on the K and the identifier;
generating, by the server device, a Message Authentication Code (MAC) based on a MAC key and MAC data, wherein the MAC key comprises the TIK, and the MAC data includes the encrypted value and the identifier;
generating, by the server device, a message to distribute the TIK, wherein generating the message comprises including a message header and a message body, the message header including the identifier and the MAC, and the message body including the encrypted value; and
transmitting, by the server device, the message to distribute the TIK to the client device.

2. The method of claim 1, wherein the identifier comprises an Anti-Replay Tag (ART).

3. The method of claim 1, wherein generating the TIK comprises using a Key Derivation Function (KDF).

4. The method of claim 1, wherein the identifier is a sequence number or a precision time.

5. The method of one of claim 1, wherein generating the identifier further comprises:

in response to the identifier being shorter than a block size of the MAC, prepending or appending cleared bits to the identifier until the bit length of the identifier matches said block size; and
in response to the identifier being longer than the block size of the MAC, converting the identifier into a shorter value, and prepending or appending cleared bits to the shorter value until the bitlength of the identifier matches said block size.

6. The method of claim 1, wherein generating the first encrypted value further comprises encrypting the TIK, by applying Advanced Encryption Standard, AES, functionality.

7. The method of claim 1, wherein generating the MAC further comprises using Hash-based Message Authentication Code (HMAC).

8. The method of claim 1, wherein generating the message to distribute the TIK further comprises obtaining only a predefined number of leading bits of the MAC.

9. A method comprising:
receiving, by a client device, a message from a server device, wherein the message corresponds to a Transaction Integrity Key (TIK) distributed by the server device to the client device, and the TIK to be used in a plurality of messages other than the received message communicated between the client device and the server device;
retrieving, by the client device, an encrypted value from the message body and an identifier, and a Message Authentication Code (MAC) from the message header;
generating, by the client device, the TIK based on the encrypted value, on the identifier and on a cryptographic key (K) other than the TIK, wherein the K has been previously shared with the server;
computing, by the client device, the MAC based on the TIK to provide a comparison result, and comparing the comparison result to the MAC in the message header; and
accepting, by the client device, the TIK as authentic in response to the result matching the received MAC.

10. The method of claim 9, wherein generating the TIK comprises decrypting the first encrypted value, by applying Advanced Encryption Standard, AES, functionality.

11. The method of claim 9, wherein computing, the MAC comprises using a Hash-based Message Authentication Code, (HMAC).

12. The method of claim 9, wherein computing the MAC further comprises obtaining only a predefined number of leading bits after the encrypting.

13. The method of claim 9, further comprising the client device rejecting the TIK in response to the comparison result not matching the received MAC.

14. A server device comprising:
a processor; and
a memory to store instructions that, when executed by the processor, cause the processor to:
generate a Transaction Integrity Key (TIK) and to generate an identifier which is unique for a cryptographic key (K) other than the TIK, wherein the K has been previously shared by the server device with a predetermined client device, and the TIK is to be used in a transaction comprising a plurality of messages communicated between the server device and the client device;
generate an encrypted value by encrypting the TIK based on the K and the identifier, and to generate a message authentication code (MAC) based on the TIK, the encrypted value and the identifier;

generate a message to distribute the TIK, wherein generating the message comprises including a message header and a message body, the message header including the identifier and the MAC, and the message body including the encrypted value; and transmit the message to distribute the TIK to the client device.

15. The server device of claim 14, wherein the instructions, when executed by the processor, further cause the processor to obtain only a predefined number of leading bits of the MAC in order to generate the message to distribute the TIK.

* * * * *